United States Patent [19]

Plamann

[11] Patent Number: 4,567,927
[45] Date of Patent: Feb. 4, 1986

[54] APPARATUS FOR AUTOMATICALLY FORMING OVALS

[76] Inventor: Kenneth O. Plamann, 3105 E. Broadway Dr., Appleton, Wis. 54915

[21] Appl. No.: 650,723
[22] Filed: Sep. 14, 1984

Related U.S. Application Data

[63] Continuation-in-part of Ser. No. 430,818, Sep. 30, 1982, abandoned.

[51] Int. Cl.⁴ .............................................. B27C 5/00
[52] U.S. Cl. ............................. 144/134 A; 144/137; 144/145 A; 144/154; 144/371; 409/179; 33/31
[58] Field of Search .............................. 409/179, 182; 144/134 R, 134 D, 136 R, 136 C, 137, 145 R, 145 A, 2 R, 363, 371, 146, 154, 134 A; 83/574; 33/31

[56] References Cited

U.S. PATENT DOCUMENTS 4,306,598 12/1981 Peof ............................... 144/134 R Primary Examiner—W. D. Bray
Attorney, Agent, or Firm—Nicholas A. Kees

[57] ABSTRACT

An apparatus for forming elliptical shapes on a workpiece. The invention involves a support frame which includes a pair of uprights having cantilevered beams from which are suspended a support disk. A pair of mutually perpendicular trammel tracks are set into this support frame. A journaled block is mounted into each trammel track. A trammel beam is rotatably mounted to the two journaled blocks, and a tool attached to the trammel beam, so that as the trammel beam rotates, with the blocks restricted to slide each only in its own track, the tool is required to follow an elliptical path. A ring is caused to revolve about the support frame by a prime mover. Attached to the ring is a bearing block, which slideably holds one end of the trammel beam. Thus as the ring revolves, the beam is caused to automatically and continually rotate, with the tool following its elliptical path. A workpiece holder holds the workpiece stationary in facing relationship in front of the tool, so that the elliptical shape is traced onto the workpiece. The support frame is provided with means to move the cantilevered arms up and down, which in turn causes the tool to move toward and away from the workpiece, thus enabling a variability in the depth of cut if the tool is a cutting tool.

17 Claims, 6 Drawing Figures

APPARATUS FOR AUTOMATICALLY FORMING OVALS

CROSS REFERENCE TO RELATED APPLICATION

This application is a continuation-in-part of copending application Ser. No. 430,818, filed Sept. 30, 1982, now abandoned.

BACKGROUND OF THE INVENTION

This invention relates to an apparatus for controlling the movement of a cutting or scribing tool relative to a workpiece, and in particular to an apparatus which facilitates formation in a workpiece of elliptical cuts or markings.

It is often useful, in the decorative as well as useful arts, to be able to make a design following an elliptical path. Items which can benefit from this design can range in size from gravy boats to doors for oversize entryways and beyond.

Conventional apparatus, such as that disclosed in Peot, U.S. Pat. No. 4,306,598, must have the trammel beam arrangement attached to the workpiece in order to function properly. This requirement limits its usefulness. If an oval is to be cut that is smaller than the workpiece support base, a router table must be used. If this base is made smaller to avoid this problem, the maximum size is then limited by the fact that the device becomes unwieldy if the trammel beam is too much longer than the workpiece support base.

Gorman, U.S. Pat. No. 4,281,694, discloses another cutting guide for use with a router. This guide, however, is designed to make a series of regularly-spaced, arcuate or circular cuts, not closed elliptical cuts of any kind.

Neither of these inventions allows for varying the depth of the cut on different passes, or for working around the edge of a workpiece, or for a sufficient range of depth of cut. Neither of these inventions allows both a major and minor radius of zero, which is necessary if the center of a workpiece must be routed out but not cut through, as with a gravy boat of an oval tray having a raised edge. This invention relates to fulfilling these needs and solutions to the problems raised thereby.

SUMMARY OF THE INVENTION

The invention gives the operator the ability to begin with a block of material. This block can then be hollowed out or turned down and shaped, and made into anything ranging from a sugar bowl to a window frame to a lighting fixture, and so on. Included is a ring which is caused to revolve about a center point by a prime mover. The center point is also the point of intersection of two mutually perpendicular trammel tracks, which are held stationary in parallel planes, one above the other. Mounted on these trammel tracks are bearing blocks, which can be allowed to slide freely along the tracks. A trammel beam is pivotably attached to the two bearing blocks. One of the bearing blocks is also adjustable with respect to the trammel beam, while the other is not. The remote end of the trammel beam always reaches at least to the ring, and a third bearing block is journaled to a point on the ring, which bearing block slideably holds the remote end of the trammel beam as the ring revolves. A tool-holding bracket is also adjustably attached to the trammel beam between the non-adjustable bearing block and the ring, for holding a cutting or scribing tool such as a router or marker. Thus as the ring and trammel beam bracket revolve, the tool traces an elliptical path, with the minor radius determined by the distance between the tool and the non-adjustable bearing block, and the major radius determined by the distance between the tool and the adjustable bearing block.

The stationary trammel tracks are preferably secured to a vertical support, via support means. A workpiece holder then holds the workpiece stationary in facing relationship in front of the tool, such that the tool can make an elliptical shape on the workpiece. The support means is adjustable such that the depth of cut made by the tool, if a cutting tool, can be varied, to allow the cutting of gravy boats, sugar bowls and such.

One object of the invention is to provide an apparatus which can automatically cut or trace an oval on a workpiece.

Another object of the invention is to provide an apparatus as described above which can be adjusted to cut or trace ovals ranging in size from a full-size door to a sugar bowl.

A more specific object of the invention is to provide an apparatus as described above having a trammel beam which carries the scribing or cutting tool and wherein the tool can be moved along the trammel beam to change the size and shape of the oval to be cut or drawn.

Another specific object of the invention is to provide an apparatus as described above having a workpiece holder which holds the workpiece stationary in facing relationship in front of the tool, and an apparatus support means which is adjustable to change the depth of the cut.

Other objects and advantages of the invention will appear hereinafter.

DESCRIPTION OF THE PREFERRED EMBODIMENTS

Figure 1:
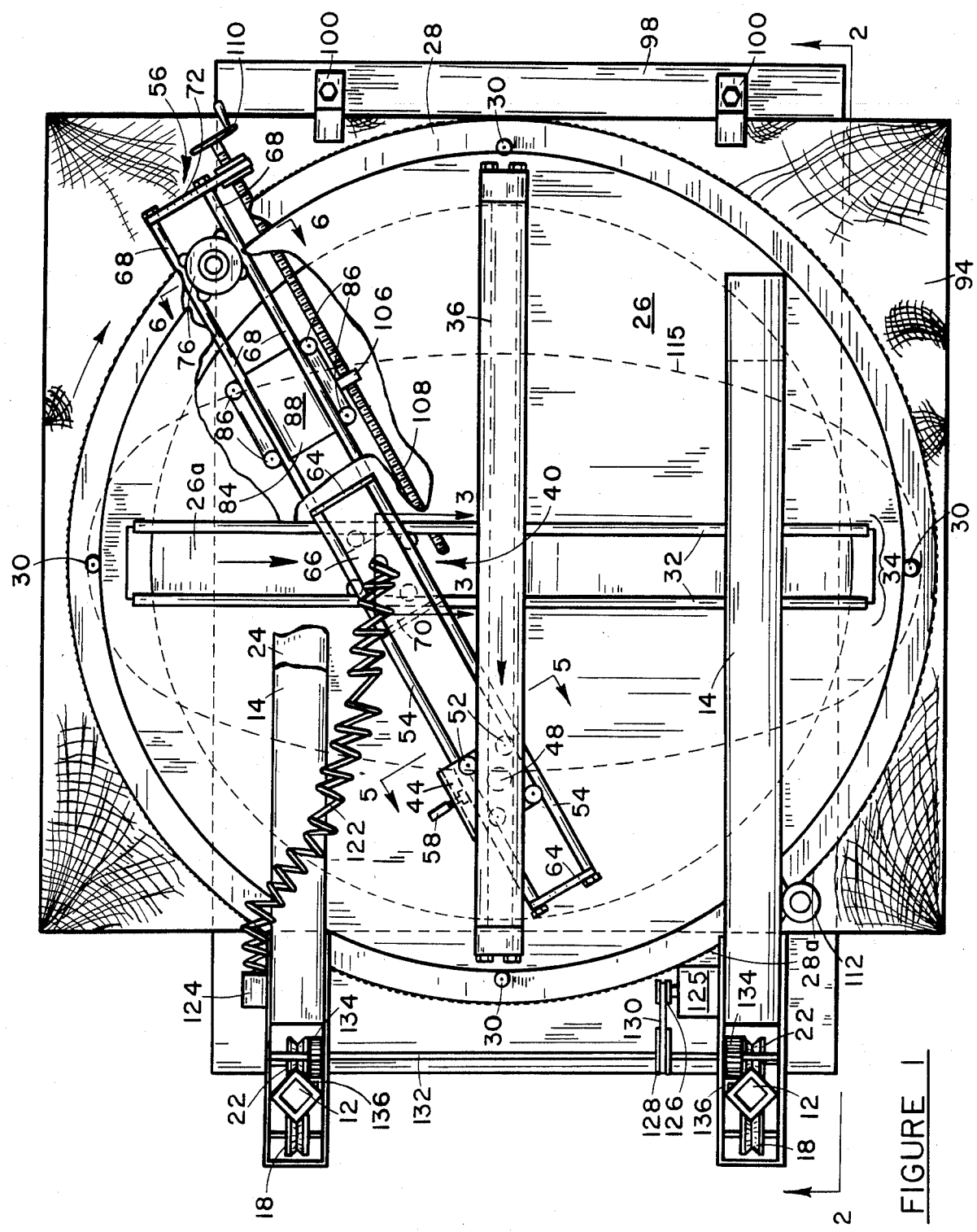
FIG. 1 is a top view of a preferred embodiment of the invention, having certain small areas cut away.
Figure 2:
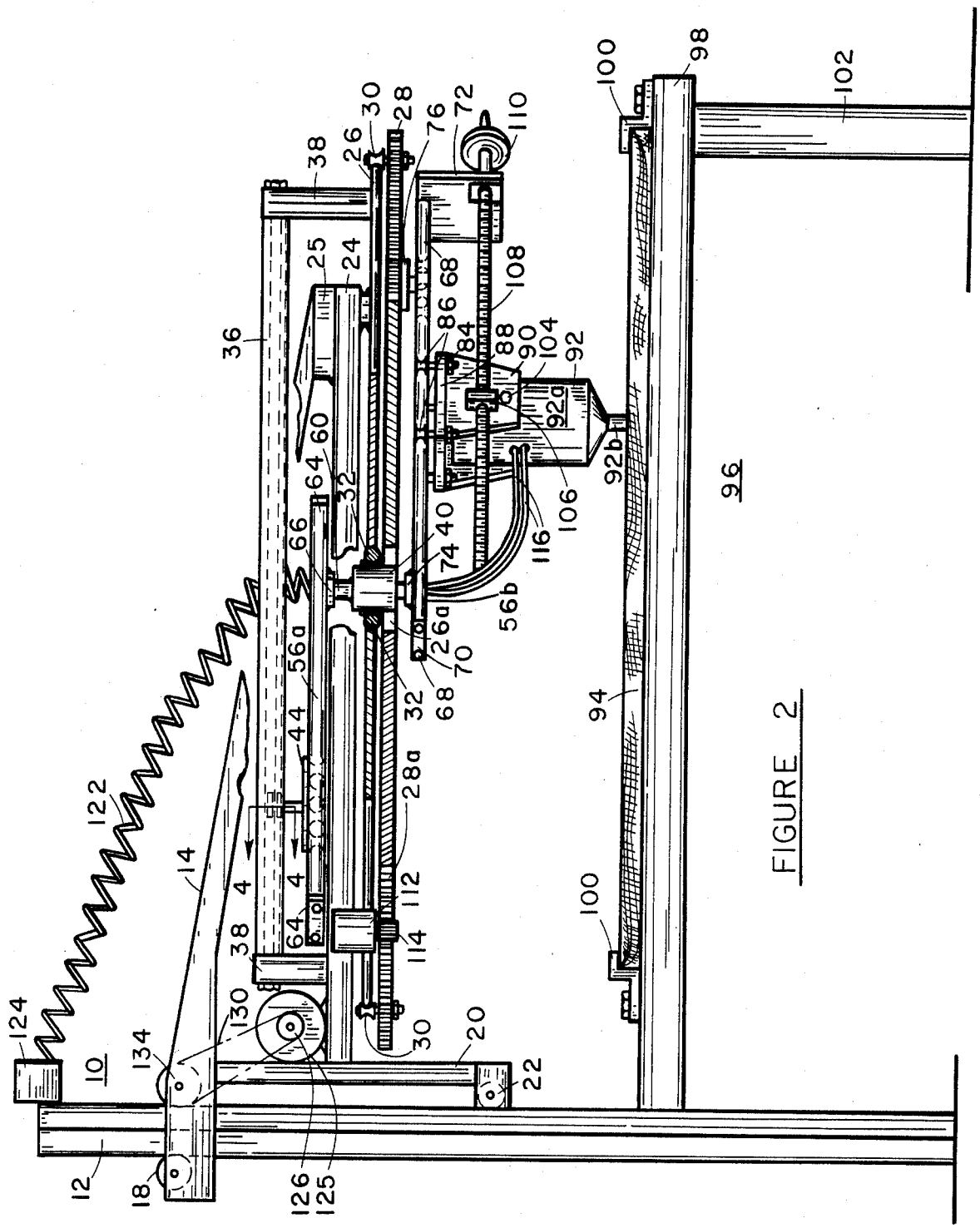
FIG. 2 is a side view of the embodiment shown in FIG. 1 taken partially in section along line 2—2 of FIG. 1.

Referring now to FIGS. 1 and 2, the preferred embodiment of the invention includes a support frame 10 made up of a pair of uprights 12 and a pair of cantilevered support arms 14, each arranged to move up or down its respective associated upright 12 on rollers 18 and 22. Each of rollers 18 is journaled in arm 14 on the side of upright 12 opposite the extending portion of arm 14. Roller 22 is journaled in a support 20 which extends downward from and is fixedly attached to arm 14 on the side of upright 12 opposite roller 18. Rollers 18 and 22 thus bear on opposite sides of upright 12. Secured to supports 20 at one end are beams 24. While beams 24 are approximately perpendicular to support 20 and therefore uprights 12, arms 14 slant or curve downward such that the distal ends of arms 14 and beams 24 are secured together by a short extension 25 to allow sufficient clearance.

Also included in support frame 10 and secured to beam 24 in a plane parallel thereto is a support disk 26. A ring 28 is rotatably suspended below disk 26. The inside radius of ring 28 should preferably be less than the radius of disk 26 while the outside radius of ring 28 should preferably be greater than the radius of disk 26. The preferred means for rotatably suspending ring 28 from disk 26 is via rollers 30 which are pivotably attached to ring 28 and which bear on the outer edge of disk 26. There must be a least three rollers 30 evenly distributed about ring 28, and preferably there are four or more for extra stability.

A long rectangular slot 26a, is formed in disk 26. The length of slot 26a is the great majority of the diameter of disk 26, and slot 26a is centered within disk 26. To the longer inside edges of slot 26a are fastened two rails 32 which run the length of the slot. Slot 26a and rails 32 combine to form the first trammel track 34 of the instant invention. The second trammel track 36 is supported by uprights 38, one at each end, such that track 36 is perpendicular to track 34 but in a plane parallel to and offset from disk 26. Uprights 38 are secured to disk 26 by any suitable permanent means.

Figure 3:
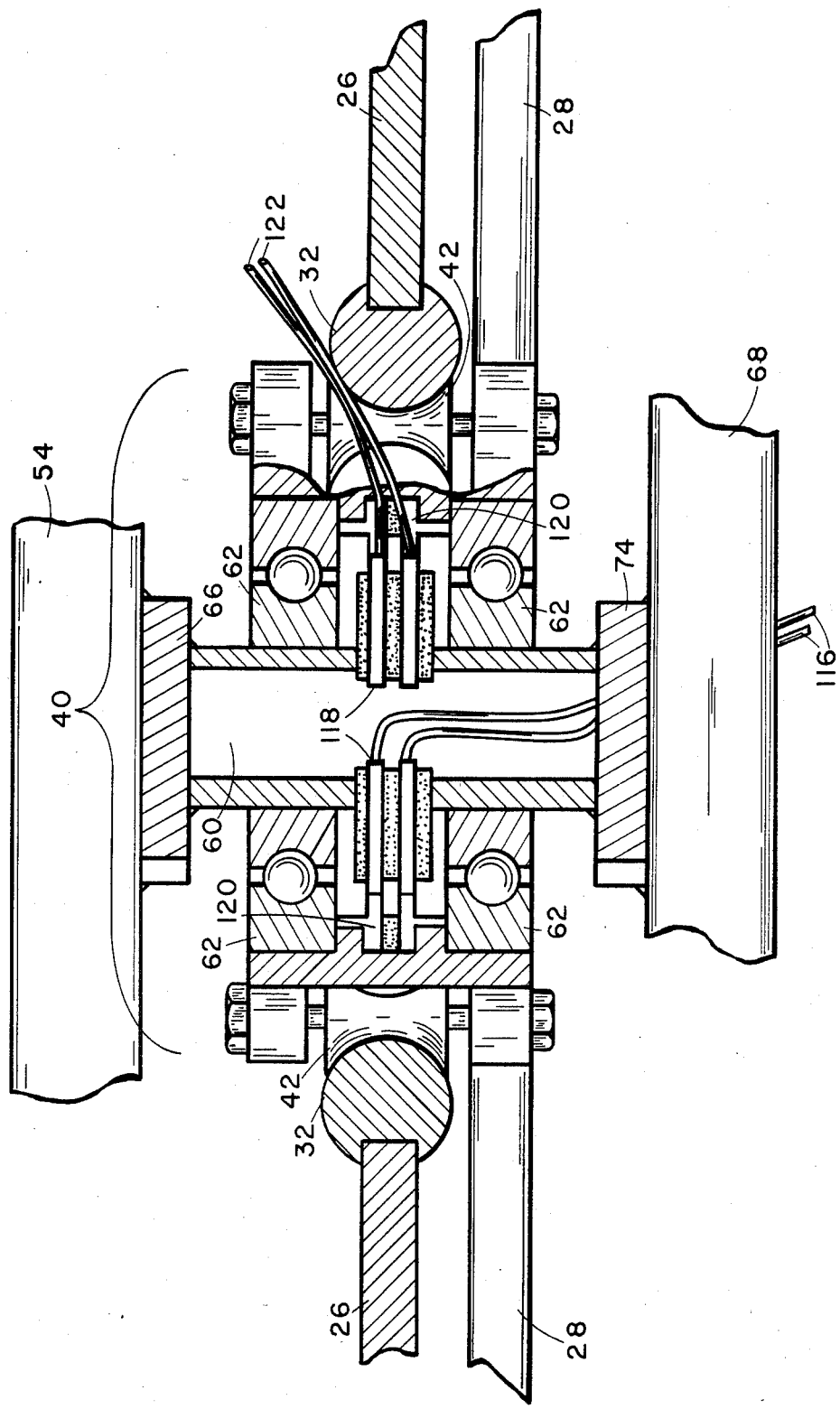
FIG. 3 is a sectional view of the embodiment shown in FIG. 1, taken along line 3—3.
Figure 4:
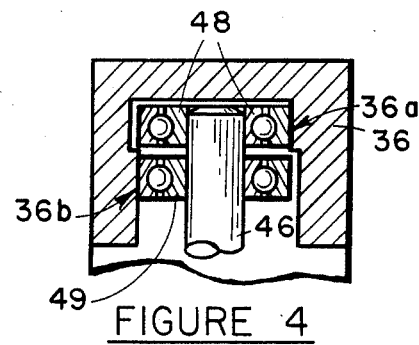
FIG. 4 is a sectional view of the embodiment shown in FIG. 2, taken along line 4—4.
Figure 5:
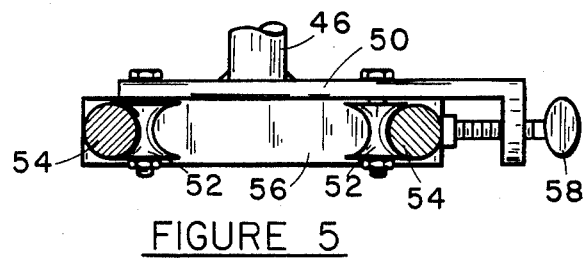
FIG. 5 is a sectional view of the embodiment shown in FIG. 1, taken along line 5—5.

Riding on rails 32 of first trammel track 34 is a non-adjustable bearing block 40, by means of rollers 42 which are journaled in bearing block 40. Bearing block 40 is shown in more detail in FIG. 3, which is a fragmentary sectional view taken along line 3—3 of FIG. 1. Ring 28 is shown in the background of FIG. 3, behind bearing block 40, for purposes of completeness. It does not contact bearing block 40, however, at any time, as can be seen by reference to FIG. 1. Slideably journaled in second trammel track 36 is an adjustable bearing block 44. The mounting of bearing block 44 in track 36 is shown in more detail in FIG. 4, which is a fragmentary sectional view of FIG. 2, taken along line 4—4. As can there be seen, bearing block 44 includes a shaft 46 which is allowed to turn as well as slide with respect to track 36 by means of bearings 48 and 49. Bearing 48 runs along one side 36a of the inside of track 36, while bearing 49 runs along the opposite side 36b. This dual bearing arrangement is preferred so that shaft 46 can turn as well as slide with respect to track 36 and still receive proper support to avoid lurching on transition from one direction to the other. However, any bearing means which performs the same function would suffice. The remainder of bearing block 44 is shown in more detail in FIG. 5. Shaft 46 is of course the same shaft as that shown in FIG. 4. As shown in FIG. 5, bearing block 44 also has a frame 50 to which the end of shaft 46 is perpendicularly secured. Journaled to frame 50 are rollers 52 which run along rails 54 of a trammel beam 56. A set screw 58 is used in the preferred embodiment to fix the position of bearing block 44 along trammel beam 56, although any other suitable means for fixing this position could be employed. Without this fixing means, block 44 would glide freely and smoothly along trammel beam 56 because of rollers 52 gliding on tracks 54.

Trammel beam 56 is in two parts, as is best shown in FIG. 2 but can also be seen in FIG. 1. Upper beam 56a is located above support disk 26 and beam 24, while the lower beam 56b is below support disk 26. The two parts of the trammel beam 56 are connected to each other by non-adjustable bearing block 40 via a common shaft 60 running therethrough, which shaft is secured to the two parts of the trammel beam 56 and journaled through bearing block 40. This internal arrangement can be seen best in FIG. 3, which shows that shaft 60 is journaled within bearing block 40 via bearing means 62.

As shown in FIGS. 1 and 2, upper trammel beam 56a includes two rails 54 connected at their ends by perpendicular end plates 64. Nearer one end of rails 54 is secured a plate 66, to which shaft 60 is attached by any relatively permanent means, such is welding, shown best in FIG. 3. Similarly, lower trammel beam 56b is constructed of two rails 68 connected at the ends by perpendicular end plates 70 and 72, as shown in FIGS. 1 and 2. A plate 74 is secured to and rigidly connects rails 68 and shaft 60, nearer end plate 70, again as shown in FIG. 3. Since the connection of shaft 60 to upper beam 56a and lower beam 56b is rigid, the upper and lower beams are always parallel as shown in FIG. 1 although in different planes as shown in FIG. 2. The distal end of lower trammel beam 56b, that is, the end closest to end plate 72 thereof, has slideably mounted therein a third bearing block 76. This bearing block 76 rolls freely along tracks 68 of the lower trammel beam via four rollers 78. Bearing block 76 is shown in more detail in FIG. 6, which is a partial section of FIG. 1 along line 6—6. As can there be seen, the outer portion of block 76, that is, the portion having rollers 78, is connected to the inner portion via bearing means 80, such that the outer portion is allowed to turn or pivot with respect to the inner portion. The inner portion is then rigidly attached in ring 28. Then another roller 82 is pivotably mounted to ring 28 directly over bearing block 76. This roller 82 runs along the outside edge of support disk 26 exactly the same way as rollers 30, described above. Thus roller 82 lends extra stability and strength to the distal end of trammel beam 56.

Figure 6:
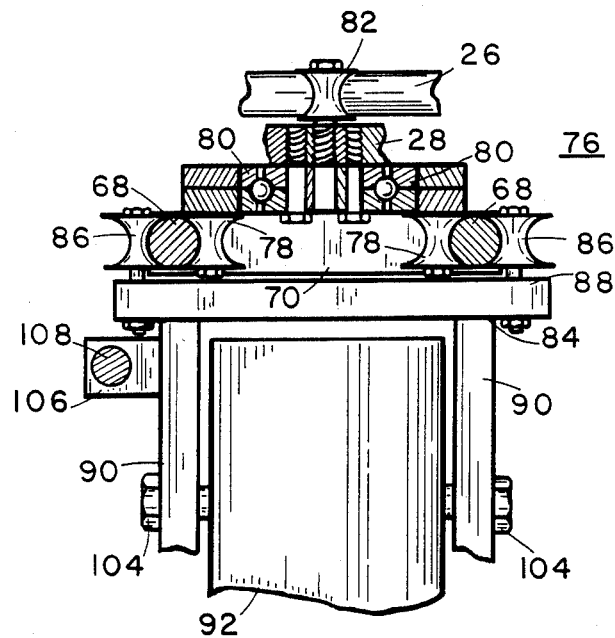
FIG. 6 is a sectional view of the embodiment shown in FIG. 1, taken along line 6—6.

As shown in FIGS. 1, 2 and 6, a tool-holding bracket 84 is mounted to lower trammel beam 56b by means of rollers 86 such that the bracket can be moved smoothly along the length of the beam. Rollers 86 are arranged to run along tracks 68 on the side opposite where the rollers 78 of bearing block 76 run. That is, as shown in FIG. 6, rollers 78 run on the insides of rails 68 while rollers 86 run on the outside, although the reverse arrangement is also possible. As shown in detail in FIG. 6, a base plate 88 of bracket 84 is attached to the axes of the rollers 86, perpendicular to those axes. Two legs 90 are attached to the underside of base plate 88 perpendicular thereto. Between legs 90 is mounted a tool 92 for cutting or marking an oval on the workpiece 94 below (FIG. 2). Workpiece 94 in turn is held against tool 92 by a support table 96 having a flat upper surface 98, a number of workpiece holding brackets 100 removably attached thereto, and legs 102 thereunder. As shown in FIG. 2, it may be preferable economically to have one end of the upper surface 98 of table 96 to be fastened to uprights 12 for support and stability purposes.

Tool 92 can be either a cutting tool, such as a router, or a scribing or marking tool, such as a plotter pen. If tool 92 is a cutting tool, then the numeral 92a designates the motor and control enclosure while 92b designates the cutting bit or blade. If tool 92 is a marking tool then numeral 92a designates the reservoir for ink or other pigment and the control enclosure while 92b designates the marking tip. As shown in FIGS. 2 and 6, tool 92 is mounted to legs 90 via pegs 104 such that tool 92 can pivot or tilt with respect to bracket 84. Thus the tool can be used to mark or cut at an angle and even to mark or cut into the outside edge of an appropriate workpiece.

As noted above, rollers 86 allow bracket 84 to move smoothly along lower trammel beam 56b. This cannot be allowed to happen, however, when the tool is in use if a proper ellipse is to be made. Accordingly, means are provided to prevent bracket 84 from moving with respect to beam 56b. As shown in FIGS. 2 and 6, an ear 106 is attached to one of the legs 90 of bracket 84. One end of a threaded rod 108 is threaded through ear 106. The opposite end of rod 108 is journaled in end plate 72 and terminates in a crank 110 (FIGS. 1 and 2). Hence by turning crank 110, bracket 84 and tool 92 can be moved along lower trammel beam 56b. Of course this is only one structure for moving and locking bracket 84 with respect to lower trammel beam 56b, and any other structure which accomplished the same function could be employed equally feasibly.

In operation, ring 28 is caused to revolve around disk 26, via rollers 30 and 82 running along the outside edge of ring 26, by any suitable means of prime mover. As shown in FIGS. 1 and 2, the preferred means is an electric motor 112 which turns a gear 114. The teeth of gear 114 mesh with teeth 28a formed integrally in the outside edge of ring 28, such that as motor 112 turns gear 114, ring 28 is forced to revolve. As ring 28 revolves, bearing block 76 revolves with it, of course, along with the distal end of trammel beam 56. Since bearing block 40 does not move with respect to trammel beam 56 and, during operation, bearing block 44 is similarly locked with respect to trammel beam 56, rotation of the distal end of trammel beam 56 with ring 28 causes the two bearing blocks 40 and 44 to move along their respective tracks 34 and 36, as shown by the directional arrows in FIG. 1. This in turn causes tool holding bracket 84, and thus tool 92 (FIG. 2) to move along an elliptical path 115. In the ellipse 115 thus formed, the minor radius is determined by the distance between tool tip 92b and shaft 60 of bearing block 40, while the major radius is determined by the distance between tool tip 92b and shaft 46 of bearing block 44. Since bearing block 44 can be positioned directly over bearing block 40 and toolholding bracket can at the same time be positioned directly thereunder, the result in that both radii can be set to zero. This is especially important if tool 92 is a routing tool, since the center of the workpiece can then be routed out to form a gravy boat, an oval tray with raised edges, or any other item having a concave vertical cross-section.

Whether tool 92 is a cutting or marking tool, it may require electrical power. In order to supply electrical power to tool 92, electrical wires 116 (FIG. 2) run from tool 92 into shaft 60 of non-adjustable bearing block 40, as shown in FIGS. 2 and 3. As shown in more detail in FIG. 3, wires 116 connect inside shaft 60 to a set of contact brushes 118, secured to shaft 60. These brushes 118 are continuously in rubbing contact with stationary contacts 120, which are secured in the outer, non-rotating portion of bearing block 40. Stationary contacts 120 in turn are electrically connected to paired wire cord 122, which may be coiled as shown in FIGS. 1 and 2 to provide the necessary flexible connection with power source 124 as bearing block 40 moves back and forth along trammel track 34.

If tool 92 is a cutting tool, it may be advantageous to provide means for varying the depth of cut. Even if tool 92 is a marking tool it would be desirable to provide means for moving the tool towards and away from workpiece 94. In the applicant's invention this means is provided by a reversing motor 125, pulleys 126 and 128 and a belt 130, although it could just as easily be chain-driven or gear-driven. Gears 134 are affixed to a common shaft 132. Pulley 128 is affixed to the same shaft 132, while pulley 126 is affixed to the shaft of motor 125 and aligned with pulley 128. Belt 130 runs between the two pulleys 126 and 128. Gears 134 mesh with the teeth of racks 136 attached vertically to uprights 12. Thus when motor 125, which is suitably attached to one of the beams 24, turns pulley 126, belt 130 causes pulley 128 to turn, which in turn causes gears 134 to turn. This causes the entire assembly including arm 14, beam 24 and in turn tool tip 92b to move up and down along uprights 12. Hence tool 92 can be moved towards and away from workpiece 94, or the depth of cut of tool 92 can be changed.

While the apparatus hereinbefore is effectively adapted to fulfill the aforesaid objects, it is to be understood that the invention is not intended to be confined to the particular preferred embodiments of oval-forming apparatus herein set forth. Rather, the invention is to be taken as including various modifications without departing from the scope of the oppended claims.

What is claimed is:

1. An apparatus for cutting elliptical shapes in a workpiece, comprising:
   a support means for supporting the apparatus;
   a pair of mutually perpendicular trammel tracks mounted to said support means;
   a pair of journaled blocks, one slideably mounted to each of said perpendicular trammel tracks;
   a trammel beam, rotatably mounted to both of said sliding blocks;
   a cutting tool attached to said trammel beam;
   means for holding the workpiece in cutting engagement with said cutting tool such that the workpiece is immobile with respect to said support means; and
   means for automatically rotating said trammel beam with respect to said workpiece and support means, such that said cutting tool automatically makes an elliptical cut in the workpiece.

2. An apparatus as recited in claim 1 wherein said support means includes means for varying the depth of cut of said cutting tool.

3. An apparatus as recited in claim 1 wherein said support means includes means for moving said cutting tool towards and away from the workpiece, such that the depth of cut made by said cutting tool in the workpiece can be varied.

4. An apparatus as recited in claim 2 or claim 3 further comprising first and second mounting means, one for each of said pair of journaled blocks, for rotatably mounting said trammel beam to said journaled blocks; and
   wherein one of said first and second mounting means is moveable along at least part of the length of said trammel beam, while the other of said first and second mounting means is not moveable with respect to said trammel beam.

5. An apparatus as recited in claim 4 further comprising attaching means for attaching said cutting tool to said trammel beam; and
   wherein said attaching means is moveable along at least part of said trammel beam.

6. An apparatus as recited in claim 5 wherein said means for attaching said cutting tool and said moveable one of said first and second mounting means are arranged such that the major and minor radii can be set to zero.

7. An apparatus as recited in claim 5 wherein said attaching means also allows said cutting tool to be tilted with respect to said trammel beam.

8. An apparatus as recited in claim 7 further comprising means for moving said attaching means and said one of said first and second mounting means which is moveable, and for locking them into positions selected by the operator.

9. An apparatus as recited in claim 8 wherein said automatically rotating means includes:
   a ring journaled about said support means outside of said trammel tracks; and
   a bearing block, secured to said ring and slideably holding an end of said trammel beam;
   said ring being caused to rotate by a prime mover;
   such that as said ring rotates, said bearing block causes said trammel beam to rotate, which in turn causes said cutting tool to make an elliptical cut in the workpiece.

10. An apparatus for marking elliptical shapes on a workpiece, comprising:
    a support means for supporting the apparatus;
    a pair of mutually perpendicular trammel tracks mounted to said support means;
    a pair of journaled blocks, one slideably mounted to each of said perpendicular trammel tracks;
    a trammel beam, rotatably mounted to both of said sliding blocks;
    a scribing tool attached to said trammel beam;
    means for holding the workpiece in marking engagement with said scribing tool such that the workpiece is immobile with respect to said support means; and
    means for automatically rotating said trammel beam with respect to said workpiece and support means, such that said scribing tool automatically makes an elliptical mark on the workpiece.

11. An apparatus as recited in claim 10 wherein said support means includes means for moving said scribing tool towards and away from the workpiece.

12. An apparatus as recited in claim 11 further comprising first and second mounting means, one for each of said pair of journaled blocks, for rotatably mounting said trammel beam to said journaled blocks; and
    wherein one of said first and second mounting means is moveable along at least part of the length of said trammel beam, while the other of said first and second mounting means is not moveable with respect to said trammel beam.

13. An apparatus as recited in claim 12 further comprising attaching means for attaching said scribing tool to said trammel beam; and
    wherein said attaching means is moveable along at least part of said trammel beam.

14. An apparatus as recited in claim 13 wherein said means for attaching said cutting tool and said moveable one of said first and second mounting means are arranged such that the major and minor radii can be set to zero.

15. An apparatus as recited in claim 13 wherein said attaching means also allows said scribing tool to be tilted with respect to said trammel beam.

16. An apparatus as recited in claim 15 further comprising means for moving said attaching means and said one of said first and second mounting means which is moveable, and for locking them into position selected by the operator.

17. An apparatus as recited in claim 16 wherein said automatically rotating means includes:
    a ring journaled about said support means outside of said trammel tracks; and
    a bearing block, secured to said ring and slideably holding an end of said trammel beam;
    said ring being caused to rotate by a prime mover;
    such that as said ring rotates, said bearing block causes said trammel beam to rotate, which in turn causes said scribing tool to make an elliptical mark on the workpiece.

* * * * *